United States Patent [19]
Nyhart et al.

[11] Patent Number: 5,408,517
[45] Date of Patent: Apr. 18, 1995

[54] METHOD AND APPARATUS FOR HANDOFF SYNCHRONIZATION

[75] Inventors: Scott O. Nyhart, Algonquin; William F. Pickert, Hoffman Estates, both of Ill.

[73] Assignee: Motorola, Inc., Schaumburg, Ill.

[21] Appl. No.: 966,485

[22] Filed: Oct. 26, 1992

[51] Int. Cl.⁶ .......................... H04B 7/26; H04Q 7/20
[52] U.S. Cl. .......................... 379/60; 379/59; 455/33.2; 455/54.1; 455/56.1
[58] Field of Search .............. 379/59, 60; 455/33.2, 455/51.1, 54.1, 56.1, 33.1, 33.4

[56] References Cited

U.S. PATENT DOCUMENTS

| | | | |
|---|---|---|---|
| 4,231,114 | 10/1980 | Dolikian | 455/49 |
| 5,140,627 | 8/1992 | Dahlin | 379/60 |
| 5,146,609 | 9/1992 | Tayloe et al. | 455/33.2 |
| 5,161,248 | 11/1992 | Bertiger et al. | 455/33.2 |
| 5,170,485 | 12/1992 | Levine et al. | 455/33.2 |
| 5,175,867 | 12/1992 | Wejke et al. | 455/33.2 |

FOREIGN PATENT DOCUMENTS

| | | | |
|---|---|---|---|
| 0073925 | 3/1989 | Japan | 455/33.2 |
| 0087727 | 3/1990 | Japan | 455/56.1 |
| 5075531 | 3/1993 | Japan | 455/33.2 |

*Primary Examiner*—John K. Peng
*Assistant Examiner*—Daniel J. Wu
*Attorney, Agent, or Firm*—Pablo Meles; Susan L. Lukasik

[57] ABSTRACT

A communication system (100) comprises a central controller (102), a plurality of base stations (104 and 106) coupled indirectly via the central controller and using radio frequency waves to communicate to communication unit(s), one of the base stations being a source base station (104) and at least another base station being a destination base station (106), and at least one communication unit (108) operable on the base stations. The communication system is able to synchronize a handoff of the communication unit between the source base station to the destination base station, wherein the source base station is the originating communication resource for the communication unit and the destination base station is the recipient communication resource for the communication unit subsequent to the handoff.

19 Claims, 2 Drawing Sheets

METHOD AND APPARATUS FOR HANDOFF SYNCHRONIZATION

TECHNICAL FIELD

This invention relates generally to a method for synchronizing a handoff and, more particularly, to a method of synchronizing a handoff between base stations having no direct communication.

BACKGROUND

Typical handoff schemes in cellular systems do not require a synchronized handoff, since a communication unit operating on the communication system would merely switch from one base station transmitting on one frequency to another base station transmitting on another frequency. The task becomes quite difficult when a source base and a destination base are required to operate on the same frequency. This problem arises for example in a handoff of a handset in a digital microcell cordless telephone system such as a CT-2 system. A switching point needs to be defined between the source base (the base with the existing conversation or present data stream) and the destination base (the base being switched to) so that no break exists in a user's conversation or data stream during a handoff. A central controller that monitors and communicates with both the source base and the destination base cannot trigger a switching point because of the unknown propagation and processing delays in the central controller and base stations. And of course, the switching point cannot be triggered by either of the bases since the base stations do not have direct communication. Thus, a need exists for a synchronization scheme that will allow for a handoff of a handset or communication unit between base stations that do not have direct communication.

SUMMARY OF THE INVENTION

A communication system comprises a central controller, a plurality of base stations coupled indirectly via the central controller and using radio frequency waves to communicate to communication units, one of the base stations being a source base station and at least another base station being a destination base station, and at least one communication unit operable on the base stations. The communication system is able to synchronize a handoff of the communication unit between the source base station to the destination base station, wherein the source base station is the originating communication resource for the communication unit and the destination base station is the recipient communication resource for the communication unit subsequent to the handoff.

DETAILED DESCRIPTION OF THE PREFERRED EMBODIMENT

Figure 1:
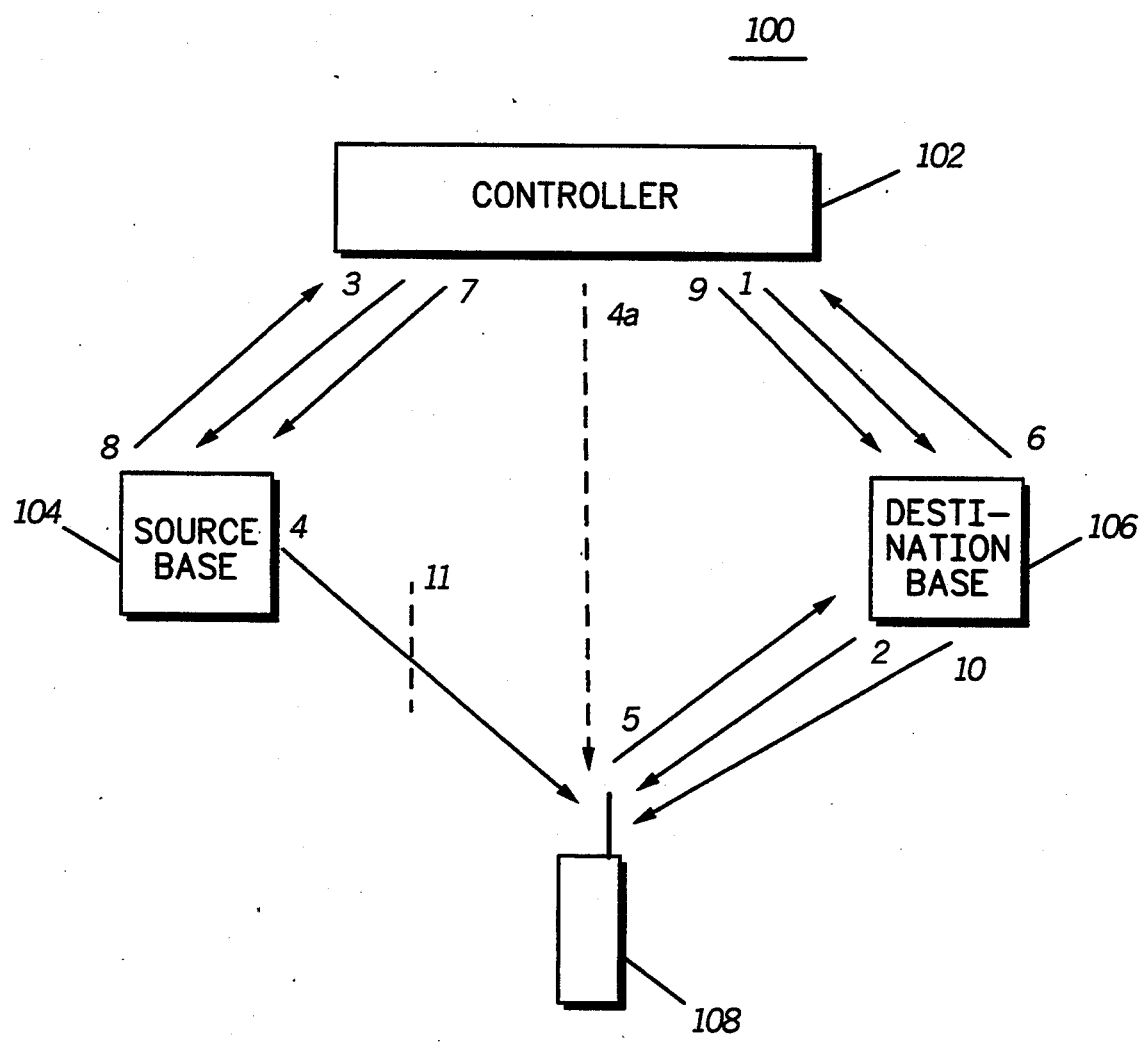
FIG. 1 is a block diagram of a communication system in accordance with the present invention.

Referring to FIG. 1, there is shown a block diagram of a communication system 100 in accordance with the present invention. The system 100 comprises of a controller 102 such as a network controller which interfaces a public switch telephone network with a plurality of base stations 104 and 106. In accordance with the present invention, the base stations 104 and 106 are coupled or communicate indirectly preferably via the controller 102. The base stations can talk to the central controller in a variety of ways including RF links, ISDN lines, analog telco lines, optical links and ethernets to name a few. The system 100 further comprises at least one communication unit 108 operable on the base stations (104 or 106). Finally, the system 100 includes a means for synchronizing a handoff of the communication unit 108 between a source base station 104 (where the communication unit 108 is presently communicating) and a destination base station 106 (where the communication unit 108 will be communicating).

Figure 2:
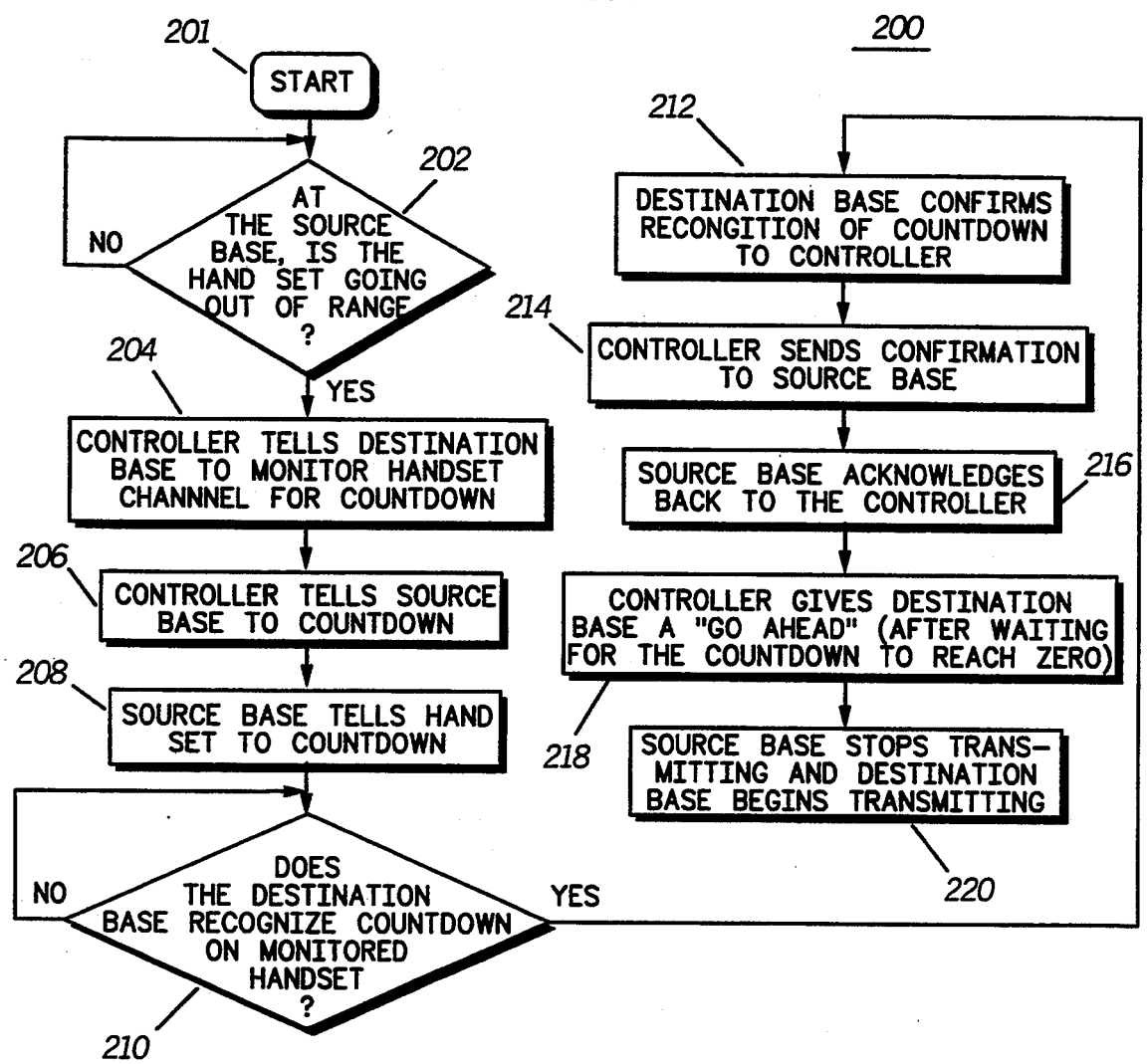
FIG. 2 is a flow chart of the operation of a communication system in accordance with the present invention.

Referring to FIGS. 1 and 2, a communication system 100 in accordance with the present invention defines a switching point between two base stations (104 and 106) so that a handoff of the communication unit 108 can occur at a specific point so that there is no break in a user's conversation or datastream. Since the switching point cannot be triggered by the controller 102 due to the unknown propagation and processing delays in the controller nor by the bases since the two base stations have no direct means of communication, an algorithm (200) must be devised to synchronize the base stations to define a switching point where the handset or communication unit 108 will handoff. In other words, the communication unit 108 and the controller 102 should be synchronized to handoff the communication unit 108 from the source base station 104 to the destination base station 106. Further, since the base stations are synchronized for transmit and receive, they cannot monitor each other's transmissions. If the destination base were to begin to transmit too soon, it would interfere with the source base transmissions. If the destination base were to begin transmitting too late, the communication unit 108 would lose the user's conversation or datastream.

Operationally, the controller 102 defines the destination base 106 and the resource or channel which the communication unit 108 will use. The destination base monitors the channel. Since the destination base 106 and the source base 104 are synchronized, the destination base will only see the communication unit 108 activity. The controller 102 then tells the source base 104 to begin the handoff.

But first, after the start 201 of the algorithm 200, either the source base 104 or the communication unit 108 itself will monitor the signal quality of the signal between the source base and the communication unit. Signal quality measurements could include received signal strength measurements or other known signal quality measurements. Additionally, the communication unit 108 should optionally measure the signal quality between the communication unit 108 and potential destination bases to determine which base to handoff to. Of course, it is assumed that destination base 106 provides the best signal quality measurements out of all other base stations (not shown.) When the signal quality measurement falls below a predetermined standard (202), the controller 102 will signal to the destination base 106 to monitor (204) the communication unit 108 for a countdown or countdown sequence signal in step 1 (steps shown in FIG. 1). Then the destination base 106 monitors the communication unit 108 in step 2. Then, the controller signals (204) to the source base 104 to relay a countdown signal to the communication unit 108 in step 3. The source base 104, in turn, signals to the communication unit 108 to begin a countdown (208) in step 4. Alternatively, if the controller can directly communicate with the communication unit 108, then the controller could directly signal to the communication unit 108 to begin a countdown as illustrated by step 4a.

At this point, the destination base should recognize (210) the countdown on the communication unit in step 5. The destination base then optionally confirms recognition (212) of the countdown on the communication to the controller 102 in step 6. The controller 102, in turn, optionally signals confirmation (214) to the source base 104 of the destination base's recognition of the countdown on the communication unit in step 7. Optionally, in step 8, the source base 104 acknowledges back to the controller (216). Finally, the controller 102 in step 9 signals to the destination base (218) to "go ahead". In step 10, the destination base transmits while in step 11 the source base stops transmitting (220). Step 10 and 11 are preferably done simultaneously.

The count down sequence is preferably a fixed sequence of a given length. The length of the sequence is defined by the number of communications and acknowledgements are required to complete handoff by the controller 102 and base stations and the processing time needed at each base or communication unit or controller. Since the destination base 106 is monitoring the channel, it sees the sequence being transmitted by the communication unit 108.

If positive confirmation of the handoff is desired, then once the destination base sees the sequence, it gives a positive confirmation to go ahead to the source base via the communication controller. The source base sees the confirmation and acknowledges back to the controller. The controller then tells the destination base that the go ahead was confirmed. Since the source base saw the positive confirmation before the end of the fixed sequence, it will stop transmitting at the end of the fixed sequence and the destination base will begin transmitting.

What is claimed is:

1. In a communication system having a central controller, a method for synchronizing a handoff of a communication unit between a source base station and a destination base station, comprising the steps of:
   (a) determining the signal quality between the source base and the communication unit;
   (b) signaling the destination base to monitor the communication unit when the signal quality between the source base and the communication unit approaches a predetermined value;
   (c) signaling the communication unit to begin a countdown;
   (d) recognizing the countdown on the communication unit by the destination base;
   (e) signaling the source base to stop transmitting to the communication unit in synchronization with a countdown sequence signal and signaling the destination base to transmit to the communication unit in synchronization with the countdown sequence signal.

2. The method of claim 1, wherein the method further includes the step after step (b) of signaling the source base to relay a countdown signal to the communication unit.

3. The method of claim 1, wherein the method further includes the step after step (d) of confirming recognition of the countdown on the communication unit to the central controller by the destination base.

4. The method of claim 3, wherein the method further includes the step after step (d) of signaling confirmation to the source base by the central controller that the destination base recognized the countdown on the communication unit.

5. The method of claim 4, wherein the method further includes the step after step (d) of acknowledging back to the central controller by the source base after the central controller signals confirmation to the source base that the destination base recognized the countdown.

6. The method of claim 5, wherein the source base acknowledges back to the central controller after reconfirming the countdown by the communication unit.

7. The method of claim 1, wherein the source base in step (c) signals the communication unit to begin a countdown.

8. The method of claim 1, wherein the central controller in step (c) signals the communication unit to begin a countdown.

9. In a communication system having a central controller, a method for synchronizing a handoff of a communication unit between a source base station and a destination base station having no direct communication, comprising the steps of:
   (a) determining the signal quality between the source base and the communication unit;
   (b) signaling the destination base by the central controller to monitor the communication unit when the signal quality between the source base and the communication unit approaches a predetermined value;
   (c) signaling to the communication unit to begin a countdown sequence signal;
   (d) recognizing the countdown sequence signal on the communication unit by the destination base;
   (e) signalling to the source base to stop transmiting to the communication unit and signaling to the destination base to transmit to the communication unit.

10. The method of claim 9, wherein the method further includes the step after step (d) of confirming recognition of the countdown on the communication unit to the central controller by the destination base.

11. The method of claim 10, wherein the method further includes the step after step (d) of signaling confirmation to the source base by the central controller that the destination base recognized the countdown on the communication unit.

12. The method of claim 11, wherein the method further includes the step after step (d) of acknowledging back to the central controller by the source base after the central controller signals confirmation to the source base that the destination base recognized the countdown.

13. A communication system having a central controller, a plurality of base stations having no direct communication between base stations, and at least one communication unit operable on said base stations, the communication system allowing for a synchronized handoff of the communication unit between a source base station and a destination base station, comprising:
   means for receiving a signal quality between the source base and the communication unit;
   means for signaling the destination base to monitor the communication unit when the signal quality between the source base and the communication unit approaches a predetermined value;
   means for signaling the communication unit to begin a countdown;

means for recognizing the countdown on the communication unit by the destination base;

means for confirming recognition of the countdown on the communication unit to the central controller by the destination base;

means for signaling confirmation to the source base by the central controller that the destination base recognized the countdown on the communication unit;

means for signaling the source base to stop transmitting to the communication unit and for signaling the destination base to transmit to the communication unit in synchronization with the countdown sequence signal.

14. The communication system of claim 13, where the system further includes the means for acknowledging back to the central controller by the source base after the central controller signals confirmation to the source base that the destination base recognized the countdown.

15. The communication system of claim 14, wherein the source base acknowledges back to the central controller after re-confirming the countdown by the communication unit.

16. The communication system of claim 13, wherein the source base in signals the communication unit to begin a countdown.

17. The communication system of claim 13, wherein the central controller in signals the communication unit to begin a countdown.

18. The communication system of claim 13, wherein the means for determining the signal quality between the source base and the communication unit comprises measuring the received signal strength at the base station.

19. A communication unit operable on a communication system, the communication system comprising:
   a central controller;
   a plurality of base stations coupled indirectly via the central controller using radio frequency waves, one of said base stations being a source base station and at least another base station being a destination base station;
   means for synchronizing a handoff of the communication unit between the source base station to the destination base station using a countdown algorithm on the communication unit, wherein the source base station is the originating communication resource for the communication unit and the destination base station is the recipient communication resource for the communication unit subsequent to the handoff.

* * * * *